United States Patent
Coady et al.

(10) Patent No.: US 12,314,816 B2
(45) Date of Patent: May 27, 2025

(54) QUBIT LAYERS FOR CONTAINERIZED LIKE EXECUTION

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 344 days.

(21) Appl. No.: 17/943,863

(22) Filed: Sep. 13, 2022

(65) Prior Publication Data

US 2024/0086753 A1    Mar. 14, 2024

(51) Int. Cl.
| | |
|---|---|
| *G06N 10/40* | (2022.01) |
| *G06F 9/445* | (2018.01) |
| *G06F 16/248* | (2019.01) |
| *G06N 10/00* | (2022.01) |
| *G06N 10/80* | (2022.01) |

(52) U.S. Cl.
CPC ......... *G06N 10/40* (2022.01); *G06F 9/44505* (2013.01); *G06F 16/248* (2019.01); *G06N 10/00* (2019.01); *G06N 10/80* (2022.01)

(58) Field of Classification Search
CPC ... G06F 16/248; G06F 9/44505; G06N 10/00; G06N 10/40; G06N 10/80
See application file for complete search history.

(56) References Cited

U.S. PATENT DOCUMENTS

| | | |
|---|---|---|
| 10,331,658 B2 | 6/2019 | Pennefather et al. |
| 11,816,534 B2* | 11/2023 | Griffin .................. G06N 10/00 |
| 2012/0068409 A1* | 3/2012 | Chamberlain ...... G07F 17/3293 |
| | | 273/292 |
| 2021/0334237 A1 | 10/2021 | Coady et al. |
| 2021/0357186 A1 | 11/2021 | Griffin et al. |
| 2021/0374583 A1 | 12/2021 | Griffin et al. |
| 2021/0406392 A1 | 12/2021 | Coady et al. |
| 2021/0406747 A1 | 12/2021 | Coady et al. |
| 2022/0027323 A1 | 1/2022 | Coady et al. |
| 2022/0066985 A1 | 3/2022 | Griffin et al. |
| 2022/0351062 A1* | 11/2022 | Coady ................. H04L 41/5048 |
| 2023/0281501 A1* | 9/2023 | Griffin .................. G06N 10/80 |
| | | 706/62 |

* cited by examiner

*Primary Examiner* — Terrell S Johnson
(74) *Attorney, Agent, or Firm* — Dority & Manning, P.A.

(57) ABSTRACT

Examples relating to qubit layers for containerized like execution are provided. In one example, a method may include obtaining a quantum service definition file. The method may include parsing the quantum service definition file to identify one or more instructions sets associated with qubit physical configuration. The method may include generating a qubit layer specification file based at least in part on the one or more instructions sets. The method may include storing the qubit layer specification file.

20 Claims, 8 Drawing Sheets

QUBIT LAYERS FOR CONTAINERIZED LIKE EXECUTION

BACKGROUND

Quantum computing involves the use of quantum bits, referred to herein as "qubits," which have characteristics that differ from those of classical (e.g., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit may not be described independently of the state of the other qubit.

SUMMARY

The examples disclosed herein relate to qubit layers for containerized like execution of quantum services on a quantum computing device. In one example, a method may include obtaining a quantum service definition file. The method may include parsing the quantum service definition file to identify one or more instructions sets associated with qubit physical configuration. The method may include generating a qubit layer specification file based at least in part on the one or more instructions sets. The method may include storing the qubit layer specification file.

In another example, a quantum computing device includes a memory. The quantum computing device includes a quantum processor device coupled to the memory. The quantum processor device is to access a quantum service definition file. The quantum processor device is to identify a qubit layer instruction in the quantum service definition file. The quantum processor device is to identify a qubit layer specification file associated with the qubit layer instruction. The quantum processor device is to obtain one or more standardized instructions for qubit physical configuration associated with the qubit layer specification file. The quantum processor device is to configure one or more qubits in accordance with the one or more standardized instructions for qubit physical configuration.

In another example, a non-transitory computer-readable storage medium incudes instructions to cause one or more processor devices to: obtain a quantum service definition file; parse the quantum service definition file to identify one or more instruction sets associated with qubit physical configuration; generate a qubit layer specification file based at least in part on the one or more instruction sets; and store the qubit layer specification file.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Finally, it is noted that while, for purposes of illustration and simplicity, examples are illustrated as being implemented by computer system that comprises a single computing device that in turn comprises a single processor device, in practice the examples/embodiments disclosed herein may be implemented in a computer system that comprises any number of computing devices, each of which may comprise one or more processor devices. Thus, irrespective of the implementation, the examples/embodiments may be implemented on a computer system that includes one or more computing devices, wherein the one or more computing devices comprise one or more processor devices, and the one or more processor devices are configured to implement functionality disclosed herein.

Quantum computing devices may execute a plurality of different quantum services by performing operations using one or more qubits. Each quantum service may be associated with a quantum service definition file, such as a Quantum Assembly File ("QASM file") as a non-limiting example. The quantum service definition file may include one or more instructions that define operations for executing the quantum service. Qubits may have to be placed into certain physical configurations associated with qubit physical properties, such as certain positions, certain polarities, and other physical configurations. In addition, certain quantum services may require certain qubits of a certain physical qubit type or may require a specific qubit environment. Instructions directed to setup and/or physical configuration of qubits to perform the quantum service may require in-depth knowledge of the nuances of physical manipulation of qubits. Errors and inefficiencies may result from improper instructions, inefficient qubit manipulations, and/or improper sequential order.

The use of layers may be a standard format for containers in classical computing applications. Layers may allow for pre-installed and/or configured applications to be exchanged among different computing devices in standardized format to allow for standardized methods to setup and/or execute services.

Examples of the present disclosure are directed to generation of qubit layers to provide for container-like execution of quantum services. More specifically, a classical and/or quantum computing device may implement a qubit layer registry (QLR). The QLR may allow for the creation and storage of a standardized layer representation format for qubits. The QLR may receive as an input a quantum service definition file, such as a QASM file. The quantum service definition file may have one or more instruction sets that describe setup and/or qubit physical properties to execute a quantum service.

The QLR may parse this information from the quantum service definition file and may create a quantum layer specification file (QLSF). The QLSF may have a standardized format. The QLSF may define instructions for actions and sequential steps that need to be performed on the qubits for setup and/or configuration of the qubits to have certain physical properties during execution of the quantum service. The QLR may associate metadata (e.g., searchable metadata) with the QLSF, such as a QLSF identifier, a version number, description or keywords associated with functionality, description or keywords associated with physical properties, or other metadata. The QLR may store the QLSF in a searchable database. A service implemented on a classical or quantum computing device or a user interacting with a classical or quantum computing device may search the database and locate a QLSF so that the computing device may pull down and instantiate the layer as part of execution of a quantum service.

For instance, a quantum service definition file may include a qubit layer instruction. The qubit layer instruction may have a standardized format. The qubit layer instruction may be associated with a specific QLSF. A quantum computing device executing a quantum service may identify the qubit layer instruction in the quantum service definition file. The quantum computing device may access the QLSF associated with the qubit layer instruction. The quantum computing device may contact the qubit registry and setup the qubits in accordance with instructions in the QLSF. The quantum computing device may propose physical manipulations to the qubits in accordance with the QLSF via, for instance, the qubit registry. The quantum computing device may associate the qubits with the quantum service. The quantum computing device may return a result to the quantum service indicating that the qubits are setup and/or configured in accordance with the qubit layer instruction.

Aspects of the present disclosure provide a number of technical effects and benefits. For instance, the use of qubit layer instructions may simplify the development of quantum service definition files, for instance, by including named references to a QLSFs as qubit layer instructions. This may lead to reduced errors in the setup and physical manipulation of qubits during execution of the quantum service, improving operation of the quantum computing device and increasing efficiency. The increased efficiency may lead to increased availability of quantum computing resources by the quantum computing device. Moreover, the standardized format of the QLSF may ensure compatibility across many different types of quantum computing devices. The use of qubit layer instructions in quantum service definition files may lead to smaller and more concise quantum service definition files that take up less memory resources. Developers specifying quantum service definition files may focus on instructions specifying logic operations as opposed to physical manipulation of qubits. The standardized format of the QLSF and the qubit layer instructions may provide for greater quantum service interchange and propagation among many different quantum computing devices. Moreover, the standardized format may provide the most efficient way to setup and manipulate qubits to have certain physical properties using a proper order of process operations. In this way, aspects of the present disclosure provide improvements to operation of a quantum computing device.

Figure 1:
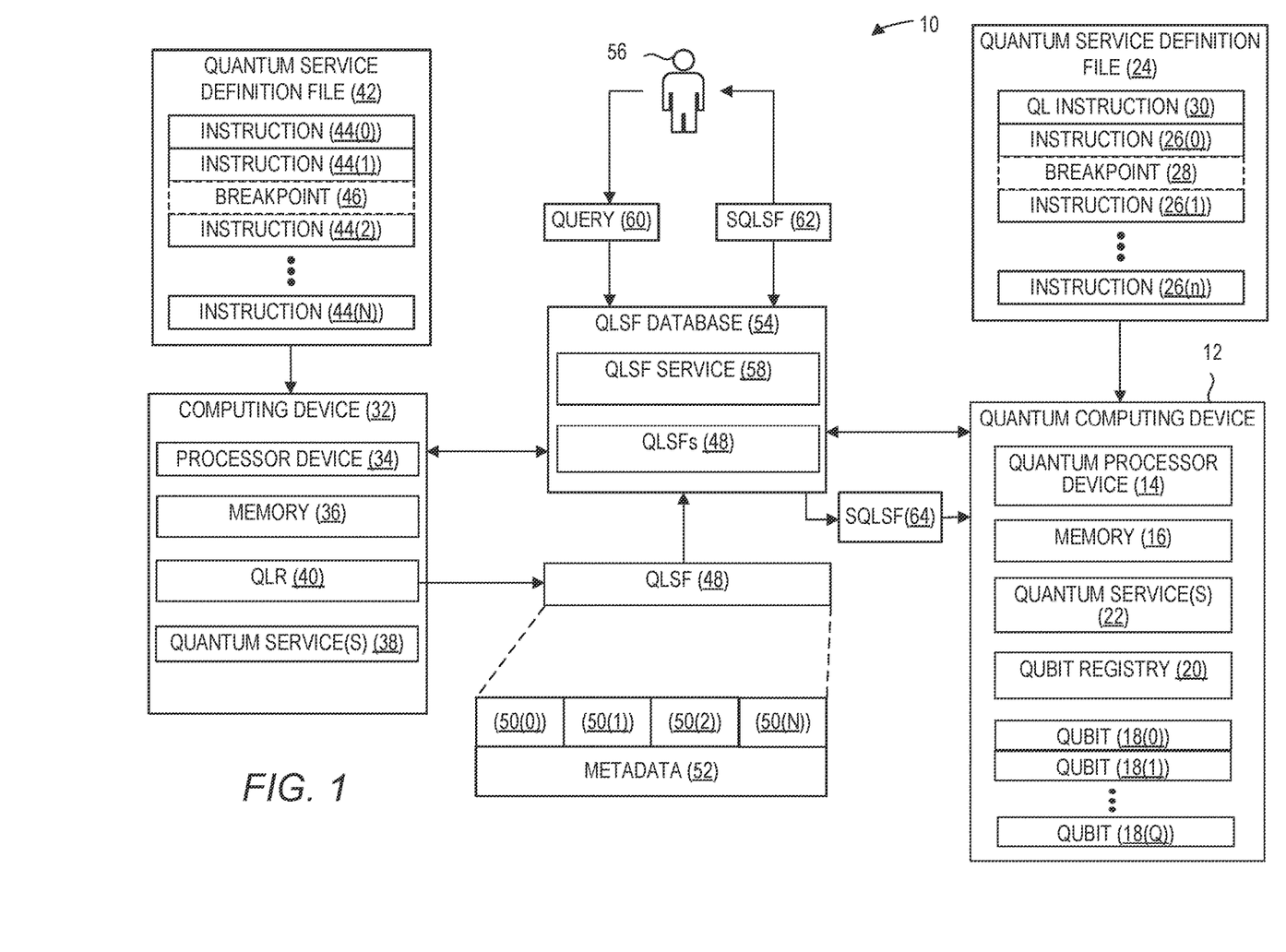
FIG. 1 depicts a computing system according to examples of the present disclosure.

FIG. 1 is a block diagram of a system 10 in which examples may be practiced. The system 10 includes a quantum computing device 12. The quantum computing device 12 may include a processor device 14 (e.g., a quantum processor device) and a memory 16. The quantum computing device 12 operates in quantum environments but is capable of operating using classical computing principles or quantum computing principles. When using quantum computing principles, the quantum computing device 12 performs computations that utilize quantum-mechanical phenomena, such as superposition and/or entanglement states. The quantum computing device 12 may operate under certain environmental conditions, such as at or near zero degrees (0°) Kelvin. When using classical computing principles, the quantum computing device 12 utilizes binary digits that have a value of either zero (0) or one (1).

In FIG. 1, the quantum computing device 12 may use qubits 18(0) . . . 18(Q), each of which has properties that differ from those of classical (i.e., non-quantum) bits used in classical computing. A qubit 18(0) . . . 18(Q) may encode quantum information for an underlying particle such as an atom or a photon and may possess characteristics that differ from those of classical (i.e., non-quantum) bits used in classical computing. For example, while a classical bit may be in a state of either one (1) or zero (0), each qubit 18(0) . . . 18(Q) may be in a "superposition" of both states simultaneously. The qubits 18(0) . . . 18(Q) may also experience a physical phenomenon referred to as "entanglement," in which the quantum state of each qubit 18(0) . . . 18(Q) may not be described independently of the state of another qubit. One application for the phenomenon of entanglement is quantum "teleportation" of a qubit. As used herein, teleportation refers to a process in which an entangled pair of qubits may be used to transmit quantum state information for a payload qubit (e.g., a qubit to be teleported) from one location to another, without having to transmit the payload qubit's underlying particle.

To maintain information for the qubits 18(0) . . . 18(Q), the quantum computing device 12 may include a qubit registry 20. The qubit registry 20 may include a plurality of qubit registry entries each corresponding to a qubit, such as one of qubits 18(0) . . . 18(Q). The qubit registry 20 maintains and provides access to data relating to the qubits 18(0) . . . 18(Q) implemented by the quantum computing device 12, such as a count of the total number of qubits implemented by the quantum computing device 12 and a count of the number of available qubits that are currently available for allocation ("qubit resource allocation"), as non-limiting examples. Each of the entries of the qubit registry 20 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state. Details concerning an example of the quantum computing device 12 will be set forth with respect to FIG. 8.

The quantum computing device 12 of FIG. 1 may execute one or more quantum services 22. A quantum service is a process that employs qubits such as the one or more qubits 18(0)-18(Q) to provide desired functionality. Each of the one or more quantum service(s) 22 may be associated with a series of process operations implemented by the quantum computing device 12. The process operations may identify qubits, configure qubits in a qubit physical configuration, instantiate qubits, place them into specific quantum states and relationships, store values using the qubits, and/or subsequently deallocate and reuse the qubits to return a result for the one or more quantum service(s) 22.

FIG. 1 depicts a single quantum service 22 for purposes of illustration and discussion. Those of ordinary skill in the art, using the disclosures provided herein will understand that the quantum computing system 12 may implement tens, hundreds or even thousands of quantum services.

The quantum service 22 may be defined by a quantum service definition file, such as quantum service definition file 24. The quantum service definition file 24 may comprise a Quantum Assembly File (QASM) file, as a non-limiting example. The quantum service definition file 24 may have a plurality of quantum programming instructions 26(0) . . . 26(n) (referred to herein as "instructions" and captioned as "INSTRUCTION" in FIG. 1) for allocating and manipulating qubits to achieve a desired functionality associated with the quantum service. The quantum service definition file 24 may include a breakpoint 28 between instructions 26(0) . . . 26(n). The breakpoint 28 may be, for instance, a reserved keyword indicating that execution of the quantum service definition file 24 should be interrupted.

As will be discussed in detail below, the quantum service definition file 24 may include a qubit layer instruction 30. The qubit layer instruction 30 may have a standardized format and may be used to provide container like execution of instructions relating to qubit physical configuration according to examples of the present disclosure. A standardized format refers to a format or formatting scheme that is universal across a plurality of different qubit layer instructions 30 so that a plurality of different types of qubit layer instructions 30 for implementing different qubit physical configurations may have a universal format across a plurality of different quantum service definition files 24. In some examples, the qubit layer instruction 30 may comprise a named reference to a quantum layer specification file as well be discussed in detail below.

The system 10 may include a computing device 32. The computing device 32 may be a classical computing device or a quantum computing device. The computing device 32 may have a processor device 34 and a memory 36. The computing device 32 may also implement one or more quantum service(s) 38. In implementations where the computing device 32 is a quantum computing device, the quantum service(s) 22 may be implemented using one or more qubits (not shown). In implementations where the computing device 32 is a classical computing device, the computing device 32 may perform a classical simulation of quantum operations to implement the quantum service(s) 22. Details concerning an example computing device 32 implemented using classical computing are discussed with reference to FIG. 7.

The computing device 32 may implement a quantum layer registry (QLR) 40. Referring to FIG. 1, because the QLR 40 is a component of the computing device 32, functionality implemented by the QLR 40 may be attributed to the computing device 32 generally. Moreover, in examples where the QLR 40 comprises software instructions that program the processor device 32 to carry out functionality discussed herein; functionality implemented by the QLR 40 may be attributed herein to the processor device 34.

It is further noted that while the QLR 40 is shown as a single component, in other implementations, the QLR 40 may be implemented in a plurality of components. Finally, it is noted that while, for purposes of illustration and simplicity, the examples are illustrated as being implemented by a single processor device on a single computing device, in other environments, such as a distributed and/or clustered environment, and where the QLR 40 is implemented in multiple components, the QLR 40 may be implemented on a computer system that includes a plurality of processor devices of a plurality of different computing devices. Thus, irrespective of the implementation, the examples may be implemented on a computer system that includes one or more processor devices of one or more computing devices.

In addition, the QLR 40 is shown in FIG. 1 as being implemented by a computing device 32 that is separate from the quantum computing device 12. However, those of ordinary skill in the art, using the disclosures provided herein, will understand that the QLR 40 may be implemented by the quantum computing device 12 without deviating from the scope of the present disclosure.

The QLR 40 may be to create and store a standardized layer representation for instruction for qubit physical configuration. For instance, the QLR 40 may receive as an input a quantum service definition file 42. Similar to the quantum service definition file 24, the quantum service definition file 42 may include one or more instruction sets 44(0) . . . 44(N) for configuring or manipulating qubits to perform quantum operations. The quantum service definition file 42 may include a breakpoint 46 between instruction sets 44(0) . . . 44(N). The breakpoint 46 may be, for instance, a reserved keyword indicating that execution of the quantum service definition file 24 should be interrupted.

Certain of the instruction sets 44(0) . . . 44(N) may be directed to qubit physical configuration and/or physical setup of one or more qubits. For instance, instruction set 44(0) may be directed to placing a qubit in a certain position. Instruction set 44(1) may be directed to placing a qubit in a certain polarity. Instruction set 44(2) may be directed to modifying a physical characteristic of a qubit. The instructions sets 44(0) . . . 44(N) may also be directed to other instructions directed to qubit physical configuration. Moreover, certain of the instructions set 44(0) . . . 44(N) the quantum service definition file 42 may be directed to other functionality of a quantum service, such as logic operations.

The QLR 40 may parse the instructions 44(0) . . . 44(N) in the quantum service definition file 42 to identify one or more instructions sets associated with qubit physical configuration, such as instruction set 44(0), instruction set 44(1), and instruction set 44(2). The QLR 40 may generate a qubit layer specification file (QLSF) 48 based on the identified instruction sets directed to qubit physical configuration.

The QLSF 48 may be a file or other resource that includes standardized instructions associated with physical configuration of qubits. In some examples, the QLSF 48 includes standardized instructions arranged in the QLSF 48 to provide for physical configuration of a qubit in a sequential process order. In some example, the sequential process order may be the most efficient order or may provide some other desired process order to physically configure the qubit in accordance with a specified qubit physical configuration.

In FIG. 1, the QLSF 48 includes standardized instructions 50(0) . . . 50(N). The standardized instructions 50(0) . . . 50(N) may provide functionality to physically manipulate one or more qubits into a qubit physical configuration. The standardized instructions 50(0) . . . 50(N) may be arranged in a sequential process order.

The QLSF 48 and/or the standardized instructions 50(0) . . . 50(N) may have a standard or universal format to provide interchangeability among many different quantum computing devices and/or quantum service definition files. A standardized format refers to a format or formatting scheme that is universal across a plurality of different qubit layer specification files 48 and instructions 50(0) . . . 50(N) so that a plurality of different types of qubit layer instructions 50(0) . . . 50(N) for implementing different qubit physical configurations may have a universal format across a plurality of different QLSFs 24. Regardless of quantum computing system type, operating system of the quantum computing system, or quantum service definition file type, the QLSF 48 and/or the standardized instructions 50(0) . . . 50(N) may have a format suitable to provide for physical manipulation of qubits into a qubit physical configuration. In this way, the QLSF 48 may be used by the quantum computing device 12 to provide for container-like execution of quantum services involving qubit physical configuration.

The QLR 40 may generate the QLSF 48 by identifying instruction sets 44(0), 44(1), and 44(2) associated with qubit physical configuration in the quantum service definition file 42. The QLR 40 may then map one or more of the instructions sets 44(0), 44(1), and 44(2) to pre-defined standardized instructions that accomplish the same physical qubit configuration. If there are no predefined standardized instructions to accomplish a certain specified qubit physical configuration, the QLR 40 may create new standardized instructions in the appropriate standard or universal format to accomplish the specified qubit physical configuration. In some examples, the QLR 40 may create the new standardized instructions to provide for the most efficient physical manipulation of a qubit to achieve the specified qubit physical configuration.

The QLR 40 may generate and/or assign metadata 52 to the QLSF 48. In some examples, the metadata 52 may be searchable metadata. The metadata 52 may include data sufficient to identify QLSF 48 and/or its functionality. The metadata 52 may include data such as a QLSF identifier, a version number, description of functionality, description of physical properties, or other metadata.

The QLR 40 may store the QLSF 48, including the standardized instructions 50(0) . . . 50(N) and metadata 52 in a QLSF database 54. The QLSF database 54 may be implemented, for instance, in memory, such as memory 36 of computing device 32, memory 16 of quantum computing device 12, or memory of one or more other classical or quantum computing devices accessible by QLR 40 over a communication network (e.g., a wired or wireless communication network). The QLSF database 54 may store a plurality of QLSFs 48, such as all QLSFs 48 generated by the system 10. The QLSF database 54 may be a searchable database that allows services (e.g., quantum services 22, 38) and/or users (e.g., user 56) to perform search queries to locate QLSFs 48 responsive to the queries and return the QLSFs 48 and/or data associated with the QLSFs 48 (e.g., standardized instructions 50(0) . . . 50(N)) in response to the search queries.

For instance, in some examples, the QLSF database 54 may implement a QLSF service 58. The QLSF service 58 may have functionality to receive search queries from other services (e.g., quantum services 22, 38) via an application programming interface and/or from users (e.g., user 56 via a suitable user interface). The QLSF service 58 may be implemented by one or more processor devices. For instance, the QLSF service 48 may be implemented by a processor device associated with the QLSF database 54, by processor device 34 of computing device 32, by quantum processor device 14 of the quantum computing device 12, or by one or more other classical or quantum processor devices accessible by components of the system 10 over a communication network.

In some examples, the user 56 may interact with the QLSF service 58 via, for instance, a suitable user interface. The user 56 may provide a query 60 (e.g., natural language query or other query) to the QLSF service 58. The QLSF service 58 may process the query 60 and identify one or more selected QLSFs 62 (designated SQLSF in FIG. 1) responsive to the query 60. The SQLSF 62 may be identified based at least in part on the metadata 52 associated with SQLSF 62. For instance, the metadata 52 associated with the SQLSF 62 may "match" or may be a good fit with information provided via the query 60, such as textual information or natural language information provide via the query 60. The QLSF service 58 may return the SQLSF 62 to the user 56 via a suitable user interface (e.g., display device).

The user 56 (e.g., a developer) may than use the SQLSF 62 in developing quantum service definition files. For instance, the user 56 may implement quantum layer instructions based on the SQLSF 62 in developing quantum service definition files to simplify instructions relating to qubit physical configuration and to provide the instructions in a uniform and standardized manner.

In some examples, the quantum service 22 may interact with the QLSF service 58 to obtain a selected QLSF 64 and/or a set of standardized instructions associated with a selected QLSF 64 for performing operations associated with qubit physical configuration during execution of the quantum service 22. More particularly, the quantum computing device 12 may obtain the quantum service definition file 24 associated with the quantum service 22. The quantum service definition file 24 may include the qubit layer instruction 30. The qubit layer instruction 30 may have a standardized format. The qubit layer instruction 30 may be associated with a specific or predetermined QLSF 48. For instance, the qubit layer instruction may be recognized to implement an associated QLSF 48. In some examples, the qubit layer instruction 30 may comprise a named reference to the QLSF 48.

The quantum computing device 12 implementing the quantum service 22 may identify the qubit layer instruction 30 in the quantum service definition file 24. The quantum computing device may query the QLSF database and access the QLSF (e.g., the SQLSF 64) associated with the qubit layer instruction 30. The quantum computing device 12 may obtain standardized instructions 50(0) . . . 50(N) for qubit physical configuration associated with the SQLSF 64.

The quantum computing device 12 may contact the qubit registry 20 and setup the qubits in accordance with standardized instructions associated with the SQLSF 64. The quantum computing device 12 may implement physical manipulations to the qubits 18(0) . . . 18(Q) in accordance with the SQLSF 64 via, for instance, the qubit registry 20. The quantum computing device 12 may associate certain or all of the qubits 18(0) . . . 18(Q) with the quantum service 22. The quantum computing device 12 may return a result to the quantum service 22 indicating that the qubits 18(0) . . . 18(Q) are setup and/or physically configured in accordance with the qubit layer instruction 30.

Figure 2:
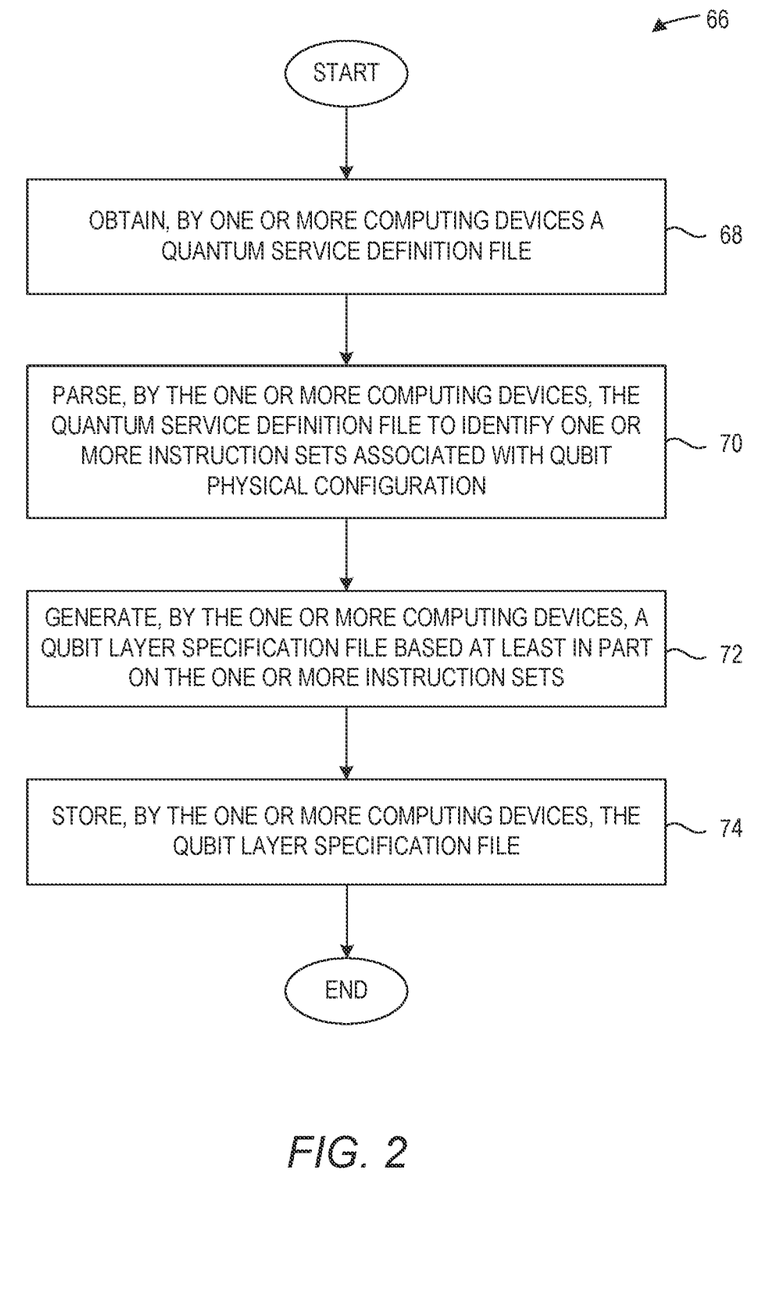
FIG. 2 depicts a flow chart of a method according to examples of the present disclosure.

FIG. 2 is a flow chart 66 of an example method according to example implementations of the present disclosure. FIG. 2 may be implemented using one or more classical and/or quantum computing devices, such as the computing device 32 of FIG. 1. Elements of FIG. 1 are referenced in describing FIG. 2 for the sake of clarity. It is to be understood that, in some examples, some operations illustrated in FIG. 2 may be performed in an order other than illustrated herein, include operations not illustrated, and/or may be omitted.

In FIG. 2, the computing device 32 may obtain a quantum service definition file 42 (Block 68). The computing device 32 may parse the quantum service definition file 42 to identify one or more instruction sets 44(0) . . . 44(N) associated with qubit physical configuration (Block 70).

The computing device 32 may generate a QLSF 48 based at least in part on the one or more instructions sets 44(0) . . . 44(N) (Block 72). The QLSF 48 may be a file or other resource that includes standardized instructions associated with physical configuration of qubits. In some examples, the QLSF 48 includes standardized instructions arranged in the QLSF 48 to provide for physical configuration of a qubit in a sequential process order. In some example, the sequential process order may be the most efficient order or may provide some other desired process order to physically configure the qubit in accordance with a specified qubit physical configuration. The computing device 32 may store the QLSF 48 (Block 74). For instance, the computing device 32 may store the QLSF 48 in a database, such as QLSF database 54.

Figure 3:
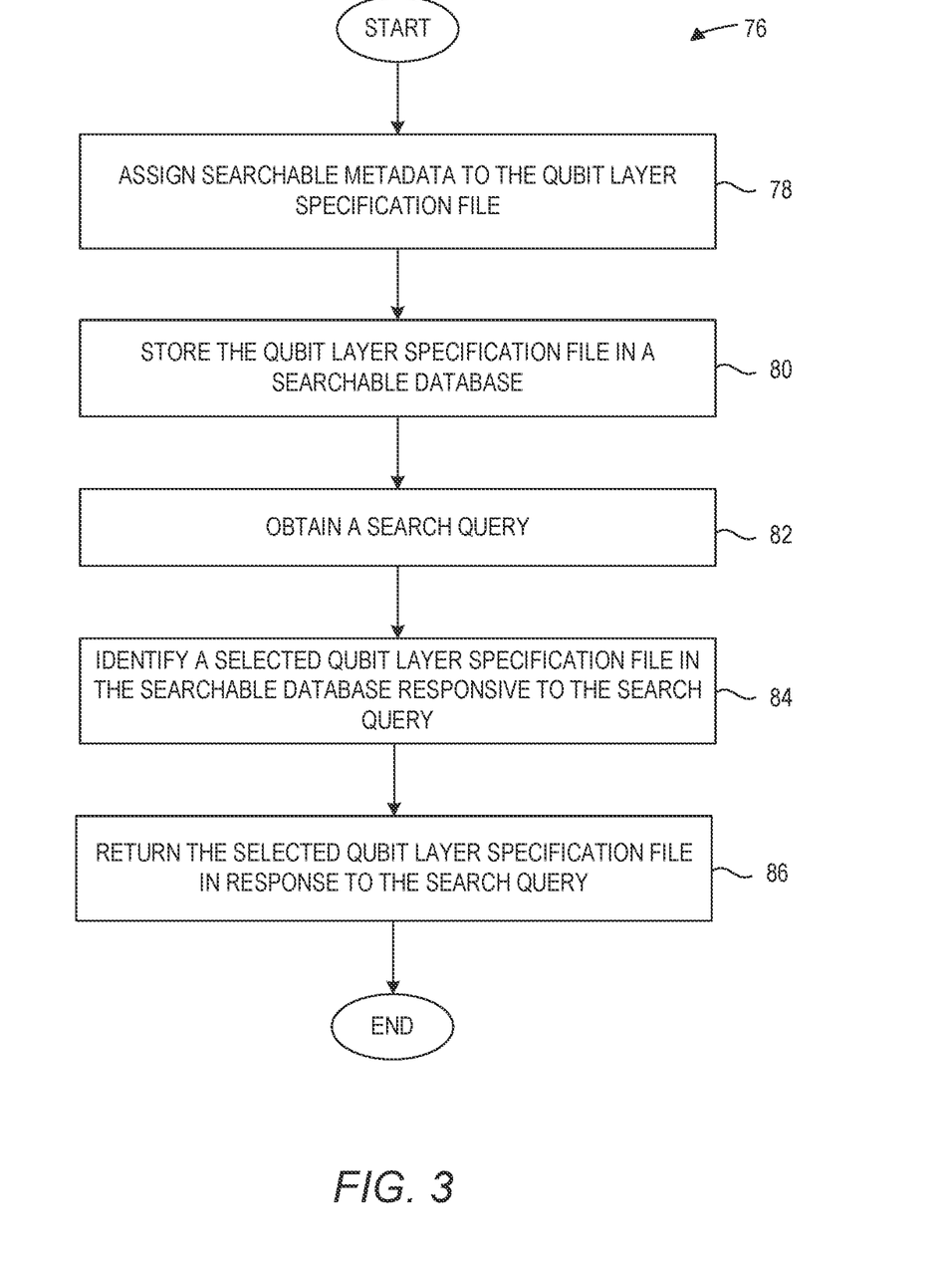
FIG. 3 depicts a flow chart of a method according to examples of the present disclosure.

FIG. 3 is a flow chart 76 of an example method according to example implementations of the present disclosure. FIG. 3 may be implemented using one or more classical and/or quantum computing devices, such as the computing device 32 of FIG. 1. Elements of FIG. 1 are referenced in describing FIG. 3 for the sake of clarity. It is to be understood that, in some examples, some operations illustrated in FIG. 3 may be performed in an order other than illustrated herein, include operations not illustrated, and/or may be omitted.

In FIG. 3, the computing device 32 may assign searchable metadata 52 to the QLSF 48 (Block 78). In some examples, the metadata 52 may include data sufficient to identify QLSF 48 and its functionality. The metadata 52 may include data such as a QLSF identifier, a version number, description of functionality, description of physical properties, or other metadata.

The computing device 32 may store the QLSF 48 in a searchable database 54 (Block 80). For instance, the computing device 32 may store the QLSF 48 along with metadata 52 in a searchable QLSF database 54.

In FIG. 3, the computing device 32 may obtain a search query 60 (e.g., from a user 56 via a user interface) (Block 82). In some examples, the computing device 32 may obtain a search query from a different computing device (e.g., quantum service 22 implemented on quantum computing device 12).

The computing device 32 may identify a selected qubit layer specification file (SQLSF) 62 in response to the query (Block 84). The SQLSF 62 may be identified based at least in part on the metadata 52 associated with SQLSF 62. For instance, the metadata 52 associated with the SQLSF 62 may match or may be a good fit with information provided via the query 60, such as textual information or natural language information provide via the search query 60. The computing device 32 may return the SQLSF 62 in response to the search query 60 (Block 86).

Figure 4:
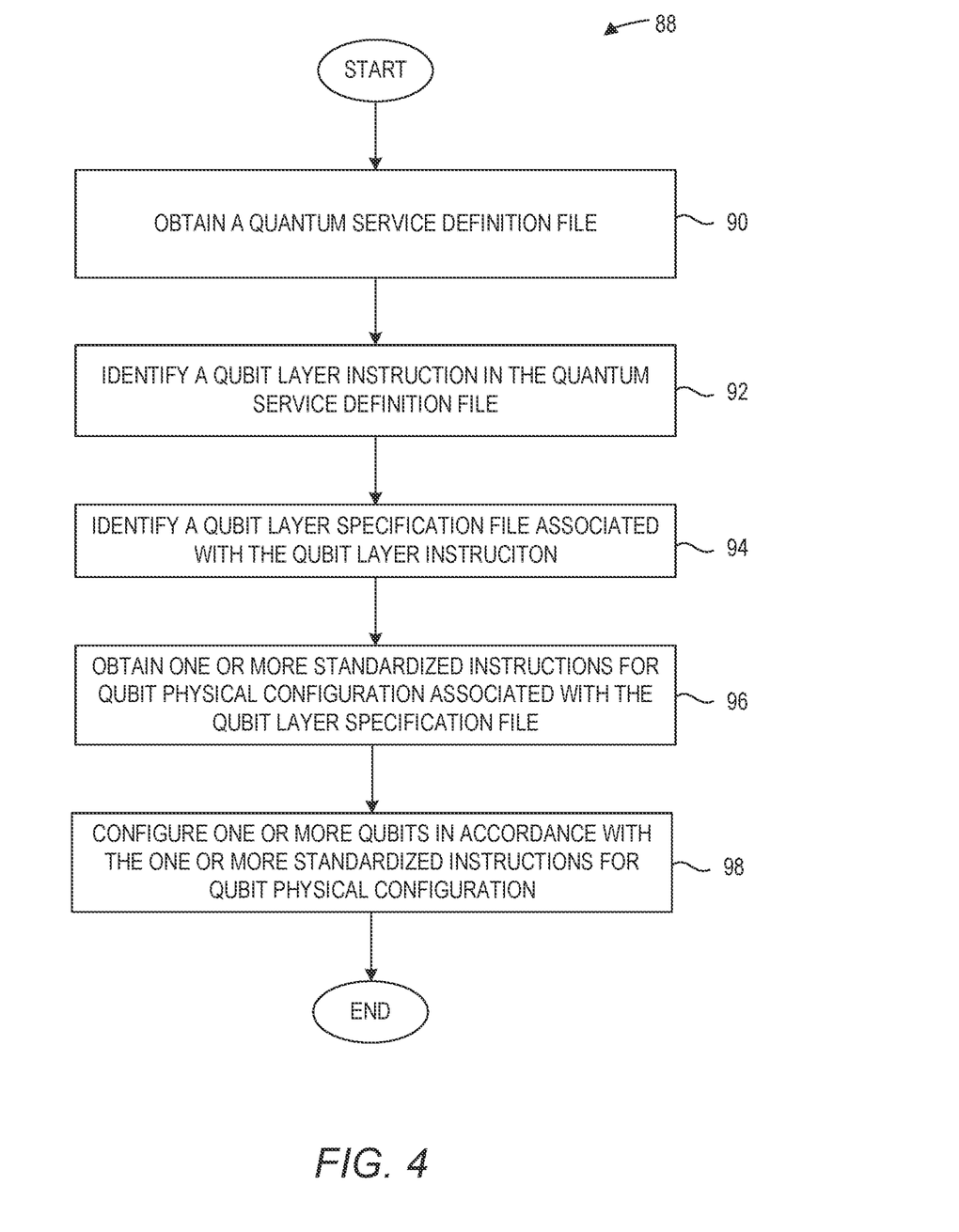
FIG. 4 depicts a flow chart of a method according to examples of the present disclosure.

FIG. 4 is a flow chart 88 of an example method according to example implementations of the present disclosure. FIG. 4 may be implemented using one or more classical and/or quantum computing devices, such as the quantum computing device 12 of FIG. 1. Elements of FIG. 1 are referenced in describing FIG. 4 for the sake of clarity. It is to be understood that, in some examples, some operations illustrated in FIG. 4 may be performed in an order other than illustrated herein, include operations not illustrated, and/or may be omitted.

The quantum computing device 12 may obtain a quantum service definition file 24 (Block 90). The quantum computing device 12 may identify a qubit layer instruction 30 in the quantum service definition file 24 (Block 92). The qubit layer instruction 30 may have a standardized format and may be used to provide container like execution of instructions relating to qubit physical configuration. The quantum computing device 12 may identify a qubit layer specification file 64 associated with the qubit layer instruction 30 (Block 94). For instance, the quantum computing device 12 may query the database 54 for the SQLSF 64 associated with the qubit layer instruction 30.

The quantum computing device 12 may obtain one or more standardized instructions (e.g., Instructions 50(0) . . . 50(N) for qubit physical configuration associated with the qubit layer specification file 64 (Block 96). The standardized instructions 50(0) . . . 50(N) may be obtained along with the qubit layer specification file 64 (e.g., as part of the file) or may be accessed from a database or other memory based on a pointer or reference in the qubit layer specification file 64.

In FIG. 4, the quantum computing device 12 may configure one or more qubits 18(0) . . . 18(Q) in accordance with the one or more standardized instructions 50(0) . . . 50(N) for qubit physical configuration. For instance, the quantum computing device 12 may implement physical manipulations to the qubits 18(0) . . . 18(Q) in accordance with the standardized instruction 50(0) . . . 50(N) via, for instance, the qubit registry 20.

Figure 5:
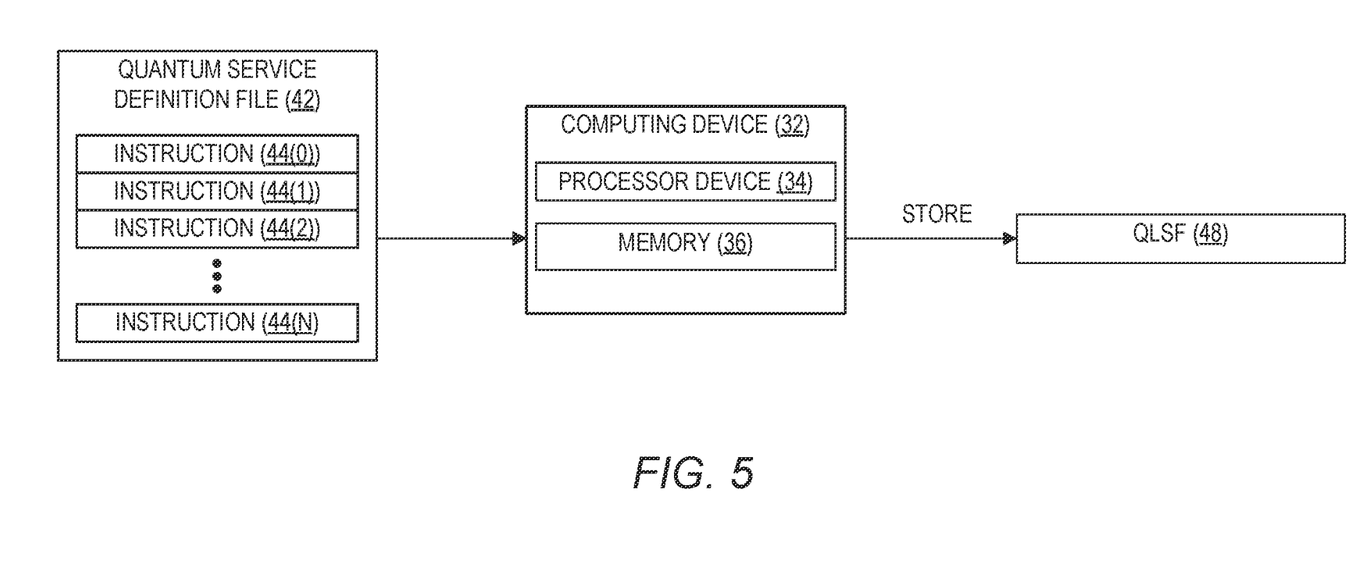
FIG. 5 depicts a system according to examples of the present disclosure.

FIG. 5 depicts a simplified diagram of a computing device 32 according to example implementations of the present disclosure. The computing device 32 includes a memory 38. The computing device 32 includes a processor device 34. The processor device 34 is communicatively coupled to the memory 38 to obtain a quantum service definition file 42. The processor device 34 is to parse the quantum service definition file 42 to identify one or more instruction sets 44(0) . . . 44(N) associated with qubit physical configuration. The processor device 34 is to generate a qubit layer specification file 48 based at least in part on the one or more instruction sets 44(0) . . . 44(N). The processor device 34 is to store the qubit layer specification file 48.

Figure 6:
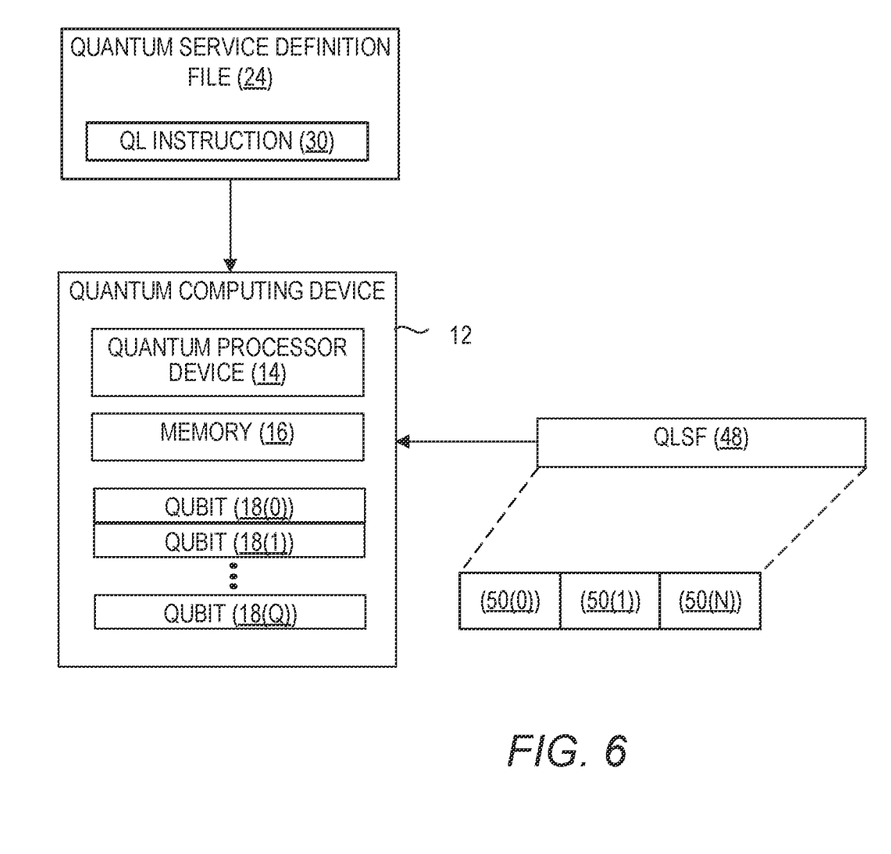
FIG. 6 depicts a system according to examples of the present disclosure.

FIG. 6 depicts a simplified diagram of a quantum computing device 12. The quantum computing device 12 includes a memory 16. The quantum computing device 12 includes a quantum processor device 14 coupled to the memory 16. The quantum processor device 14 is to obtain a quantum service definition file 24. The quantum processor device 14 is to identify a qubit layer instruction 30 in the quantum service definition file 24. The quantum processor device 14 is to identify a qubit layer specification file 48 associated with the qubit layer instruction 30. The quantum processor device 14 is to obtain one or more standardized instructions 50(0) . . . 50(N) for qubit physical configuration associated with the qubit layer specification file 48. The quantum processor device 14 is to configure one or more qubits 18(0) . . . 18(Q) in accordance with the one or more standardized instructions 50(0) . . . 50(N) for qubit physical configuration.

Figure 7:
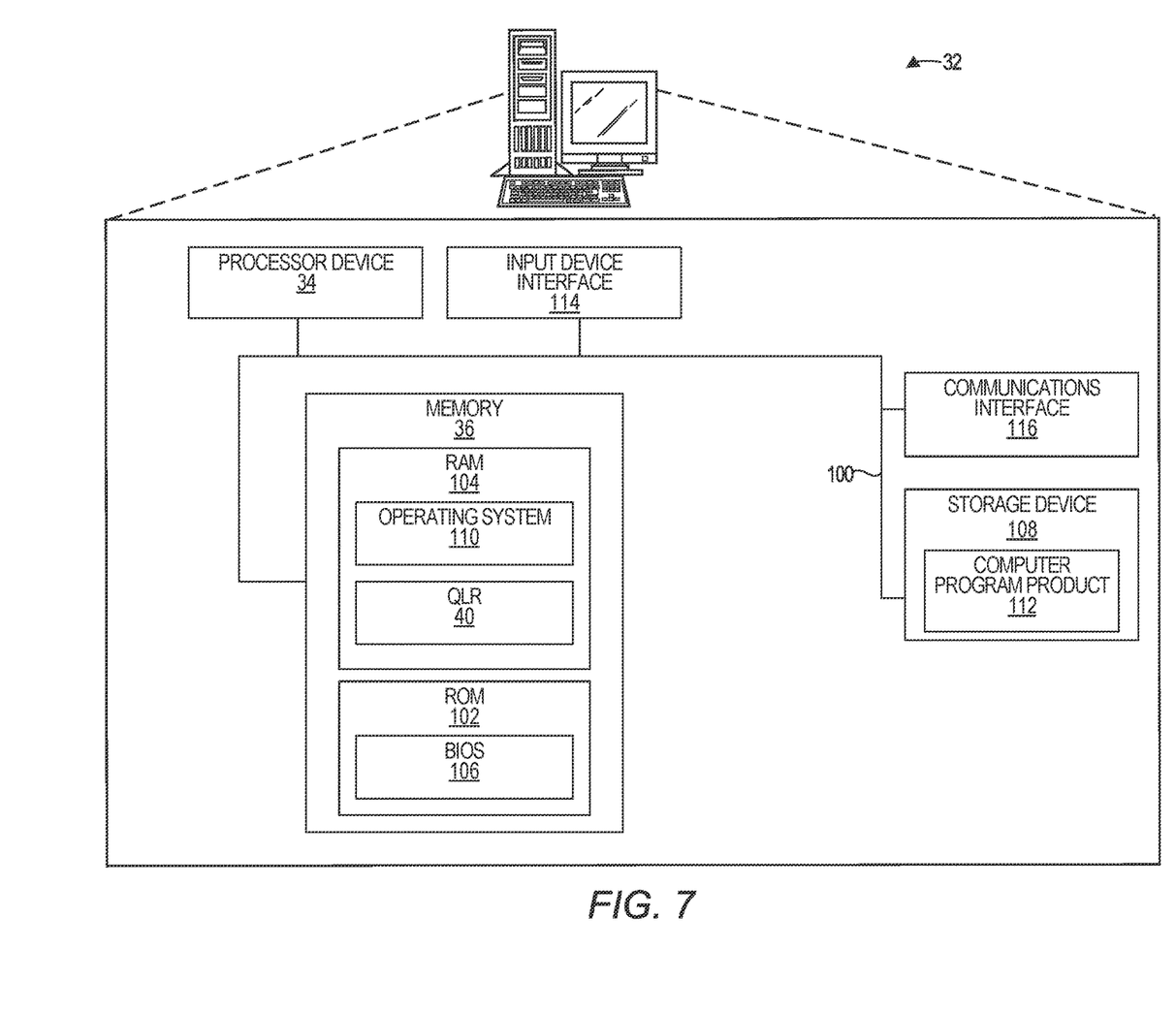
FIG. 7 depicts an example computing device to implement examples according to the present disclosure.

FIG. 7 is a block diagram of the computing device 32 suitable for implementing examples. FIG. 7 is representative of computing device 32 for purposes of illustration. The computing device 32 may comprise any computing or electronic device capable of including firmware, hardware, and/or executing software instructions to implement the functionality described herein, such as a computer server, a desktop computing device, a laptop computing device, or the like. The computing device 32 includes the processor device 34, the memory 36, and a system bus 100. The system bus 100 provides an interface for system components including, but not limited to, the memory 38 and the processor device 34. The processor device 34 may be any commercially available or proprietary processor.

The memory 38 may include non-volatile memory 102 (e.g., read-only memory (ROM), erasable programmable read-only memory (EPROM), electrically erasable programmable read-only memory (EEPROM), etc.), and volatile memory 104 (e.g., random-access memory (RAM)). A basic input/output system (BIOS) 106 may be stored in the non-volatile memory 102 and may include the basic routines that help to transfer information between elements within the computing device 32. The volatile memory 104 may also include a high-speed RAM, such as static RAM, for caching data.

The computing device 32 may further include or be coupled to a non-transitory computer-readable storage medium such as the storage device 108, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 108 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules may be stored in the storage device 108 and in the volatile memory 104, including an operating system 110 and one or more program modules, such as the QLR 40, which may implement the functionality described herein in whole or in part.

All or a portion of the examples may be implemented as a computer program product 112 stored on a transitory or non-transitory computer-usable or computer-readable storage medium, such as the storage device 108, which includes complex programming instructions, such as complex computer-readable program code, to cause the processor device 34 to carry out the steps described herein. Thus, the computer-readable program code may comprise software instructions for implementing the functionality of the examples described herein when executed on the processor device 34. The processor device 34, in conjunction with the QLR 40 in the volatile memory 104, may serve as a controller, or control system, for the computing device 32 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 34 through an input device interface 114 that is coupled to the system bus 100 but may be connected by other interfaces such as a parallel port, an Institute of Electrical and Electronic Engineers (IEEE) 1394 serial port, a Universal Serial Bus (USB) port, an IR interface, and the like.

The computing device 32 may also include a communications interface 116 suitable for communicating with a network or other devices as appropriate or desired.

Figure 8:
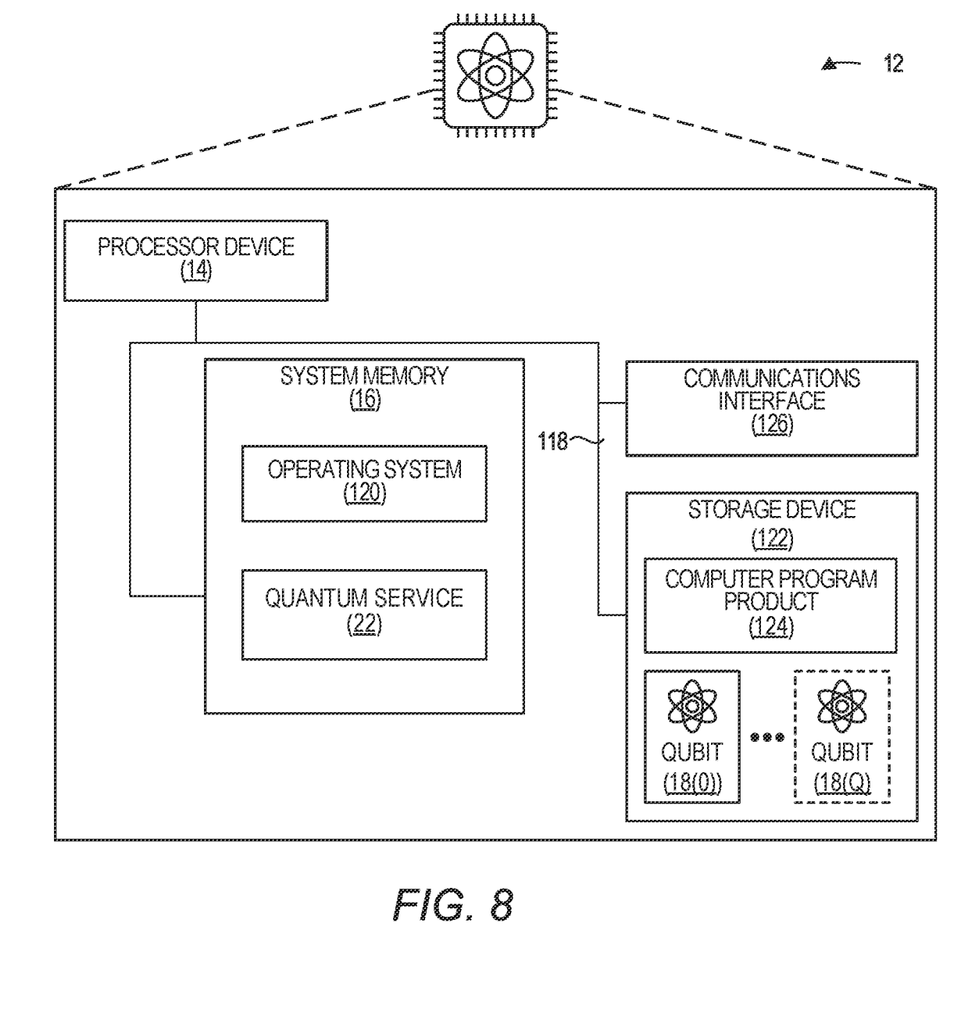
FIG. 8 depicts an example quantum computing device to implement examples according to the present disclosure.

FIG. 8 is a block diagram of a quantum computing device 12 suitable for implementing examples according to example implementations. The quantum computing device 12 may comprise any computing or electronic device capable of including firmware, hardware, and/or executing software instructions to implement the functionality described herein in a quantum environment. The quantum computing device 12 includes one or more quantum processor device(s) 14, one or more memory device(s) 16 and a system bus 118. The system bus 118 provides an interface for system components including, but not limited to, the one or more memory device(s) 16 and the quantum one or more processor device(s) 14. The one or more quantum processor device(s) 14 may be any commercially available or proprietary classical and/or quantum processor suitable for operating in a quantum environment (e.g., using one or more qubits). The one or more memory device(s) 16 may store computer-readable instructions associated with an operating system 120 and/or a quantum service 22.

The quantum computing device 12 may further include or be coupled to a non-transitory computer-readable storage medium such as a storage device 122. The storage device 122 and other drives associated with computer-readable media and computer-usable media may provide non-volatile storage of data, data structures, computer-executable instructions, and the like. The storage device 122 may also store one or more qubits 18(0) . . . 18(Q), which may be measured and/or manipulated by the one or more processor device(s) 14 when performing quantum computing operations.

All or a portion of the examples may be implemented as a computer program product 124 stored on a transitory or non-transitory computer-usable or computer-readable storage medium, such as the storage device 122, which includes complex programming instructions, such as complex computer-readable program code, to cause the one or more processor devices 14 to carry out the functionality described herein. Thus, the computer-readable program code may comprise software instructions for implementing the functionality of the examples described herein when executed on the one or more processor devices 14.

An operator may also be able to enter one or more configuration commands through a keyboard (not illustrated), a pointing device such as a mouse (not illustrated), or a touch-sensitive surface (not illustrated). The quantum computing device 12 may also include a communications interface 126 suitable for communicating with other computing devices, including, in some implementations, classical computing devices and/or quantum computing devices.

Individuals will recognize improvements and modifications to the preferred examples of the disclosure. All such improvements and modifications are considered within the scope of the concepts disclosed herein and the claims that follow.

What is claimed is:

1. A method, comprising:
   obtaining, by one or more computing devices, a quantum service definition file;
   parsing, by the one or more computing devices, the quantum service definition file to identify one or more instruction sets associated with qubit physical configuration;
   generating, by the one or more computing devices, a qubit layer specification file based at least in part on the one or more instruction sets; and
   storing, by the one or more computing devices, the qubit layer specification file.

2. The method of claim 1, wherein the qubit layer specification file has a standardized format.

3. The method of claim 1, wherein the qubit layer specification file has one or more standardized instructions associated with qubit physical configuration.

4. The method of claim 3, wherein the one or more standardized instructions are arranged in the qubit layer specification file to provide for physical configuration of a qubit in a sequential process order.

5. The method of claim 1, wherein the one or more instruction sets associated with qubit physical configuration are associated with placing a qubit in a certain position, placing a qubit in a certain polarity, or modifying a physical characteristic of a qubit.

6. The method of claim 1, wherein the method comprises assigning, by the one or more computing devices, searchable metadata with the qubit layer specification file.

7. The method of claim 6, wherein storing, by the one or more computing devices, the qubit layer specification file comprises storing, by the one or more computing devices, the qubit layer specification file in a searchable database of a plurality of qubit layer specification files.

8. The method of claim 7, wherein the method comprises:
   obtaining, by the one or more computing devices, a search query;
   identifying, by the one or more computing devices, a selected qubit layer specification file in the searchable database responsive to the search query; and
   returning, by the one or more computing devices, the selected qubit layer specification file in response to the search query.

9. The method of claim 1, wherein the method comprises:
   obtaining, by one or more quantum computing devices, a second quantum service definition file;
   identifying, by the one or more quantum computing devices, a qubit layer instruction in the second quantum service definition file;
   identifying, by the one or more quantum computing devices, the qubit layer specification file associated with the qubit layer instruction;
   obtaining, by the one or more quantum computing devices, one or more standardized instructions for qubit physical configuration associated with the qubit layer specification file; and
   configuring, by the one or more quantum, computing devices, one or more qubits in accordance with the one or more standardized instructions for qubit physical configuration.

10. A quantum computing device, comprising:
    a memory; and
    a quantum processor device coupled to the memory;
    the quantum processor device is to:
    obtain a quantum service definition file;
    identify a qubit layer instruction in the quantum service definition file;
    identify a qubit layer specification file associated with the qubit layer instruction;
    obtain one or more standardized instructions for qubit physical configuration associated with the qubit layer specification file; and
    configure one or more qubits in accordance with the one or more standardized instructions for qubit physical configuration.

11. The quantum computing device of claim 10, wherein the qubit layer specification file has a standardized format.

12. The quantum computing device of claim 10, wherein the standardized instructions are arranged in the qubit layer specification file to provide for configuration of one or more qubits in a sequential process order.

13. The quantum computing device of claim 10, wherein the qubit layer specification file is generated by a processor device, the processor device is to:
    obtain a second quantum service definition file;
    parse the second quantum service definition file to identify one or more instruction sets associated with qubit physical configuration;
    generate the qubit layer specification file based at least in part on the one or more instruction sets; and
    store the qubit layer specification file.

14. The quantum computing device of claim 13, wherein the processor device is to assign searchable metadata with the qubit layer specification file.

15. The quantum computing device of claim 14, wherein the processor device is to store the qubit layer specification file in a searchable database.

16. The quantum computing device of claim 15, wherein the processor device is to:
    obtain a search query;
    identify a selected qubit layer specification file in the searchable database responsive to the search query; and
    return the selected qubit layer specification file in response to the search query.

17. A non-transitory computer-readable storage medium comprising instructions to cause one or more processor devices to:
    obtain a quantum service definition file;
    parse the quantum service definition file to identify one or more instruction sets associated with qubit physical configuration;
    generate a qubit layer specification file based at least in part on the one or more instruction sets; and
    store the qubit layer specification file.

18. The non-transitory computer-readable storage medium of claim 17, wherein the qubit layer specification file has a standardized format.

19. A quantum computing device, comprising:
    a memory; and
    a quantum processor device coupled to the memory, the quantum processor device to:
    obtain a quantum service definition file;

parse the quantum service definition file to identify one or more instruction sets associated with qubit physical configuration;
generate a qubit layer specification file based at least in part on the one or more instruction sets; and
store the qubit layer specification file.

20. A method comprising:

obtaining, by a quantum computing device, a quantum service definition file;

identifying, by the quantum computing device, a qubit layer instruction in the quantum service definition file;

identifying, by the quantum computing device, a qubit layer specification file associated with the qubit layer instruction;

obtaining, by the quantum computing device, one or more standardized instructions for qubit physical configuration associated with the qubit layer specification file; and configuring, by the quantum computing device, one or more qubits in accordance with the one or more standardized instructions for qubit physical configuration.

* * * * *